United States Patent [19]

Martinek

[11] 4,075,938

[45] Feb. 28, 1978

[54] METHOD AND APPARATUS FOR MAKING END CLOSURES FOR SHIRRED CASING STICKS

[75] Inventor: Thomas W. Martinek, Covington, Ind.

[73] Assignee: Teepak, Inc., Chicago, Ill.

[21] Appl. No.: 690,745

[22] Filed: May 27, 1976

[51] Int. Cl.² .............................................. A22C 13/00
[52] U.S. Cl. .................... 9.3/84 TW; 17/34
[58] Field of Search ............... 17/33, 34, 42, 49; 426/140; 53/370; 93/84 TW, 77 R, 94 R, 60, 36.8, 27

[56] References Cited

U.S. PATENT DOCUMENTS

| | | | |
|---|---|---|---|
| 3,115,668 | 12/1963 | Townsend | 17/33 |
| 3,162,893 | 12/1964 | Townsend | 53/370 X |
| 3,274,005 | 9/1966 | Alsys | 426/140 |
| 3,419,401 | 12/1968 | Matecki | 17/34 UX |
| 3,865,954 | 2/1975 | Tums et al. | 426/140 |
| 3,892,869 | 7/1975 | Sheridan et al. | 426/140 X |

*Primary Examiner*—James F. Coan
*Attorney, Agent, or Firm*—John J. Kowalik; Joseph E. Kerwin; William A. Dittman

[57] ABSTRACT

A hollow shirred casing stick is provided having the terminal pleats of one end thereof twisted into a cylindrical configuration which is implanted within said hollow stick to form an end closure. The end closure may be formed by twisting successive terminal pleats into the bore of the stick about a rotating mandrel advanced thereinto. A device is provided for forming the closure including a rotating and translating mandrel having retractable pickup means and gripping means, whereby a cylindrical closure may be formed thereabout, and the mandrel withdrawn, without disturbing the closure formed.

22 Claims, 6 Drawing Figures

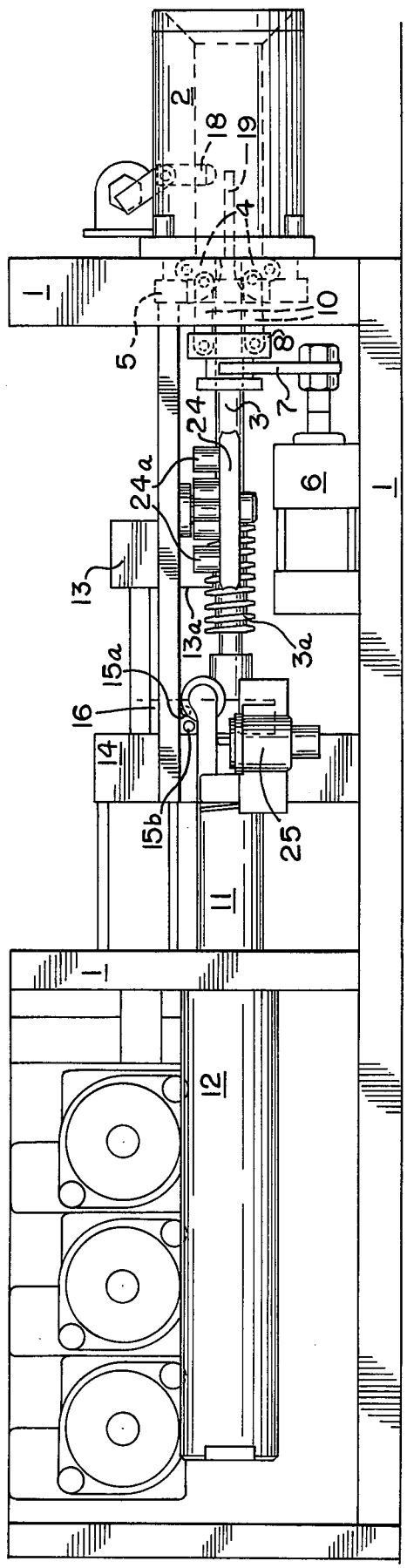
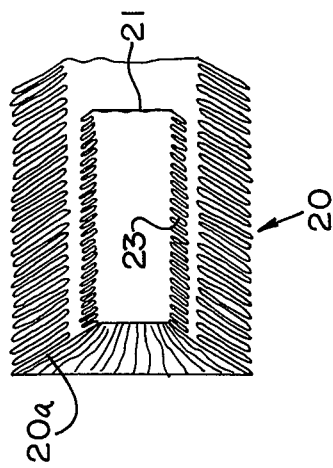
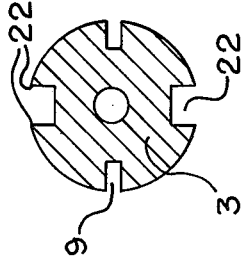
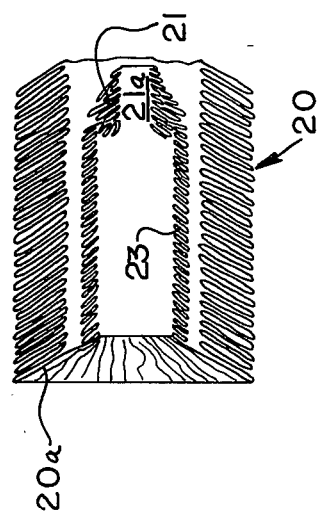

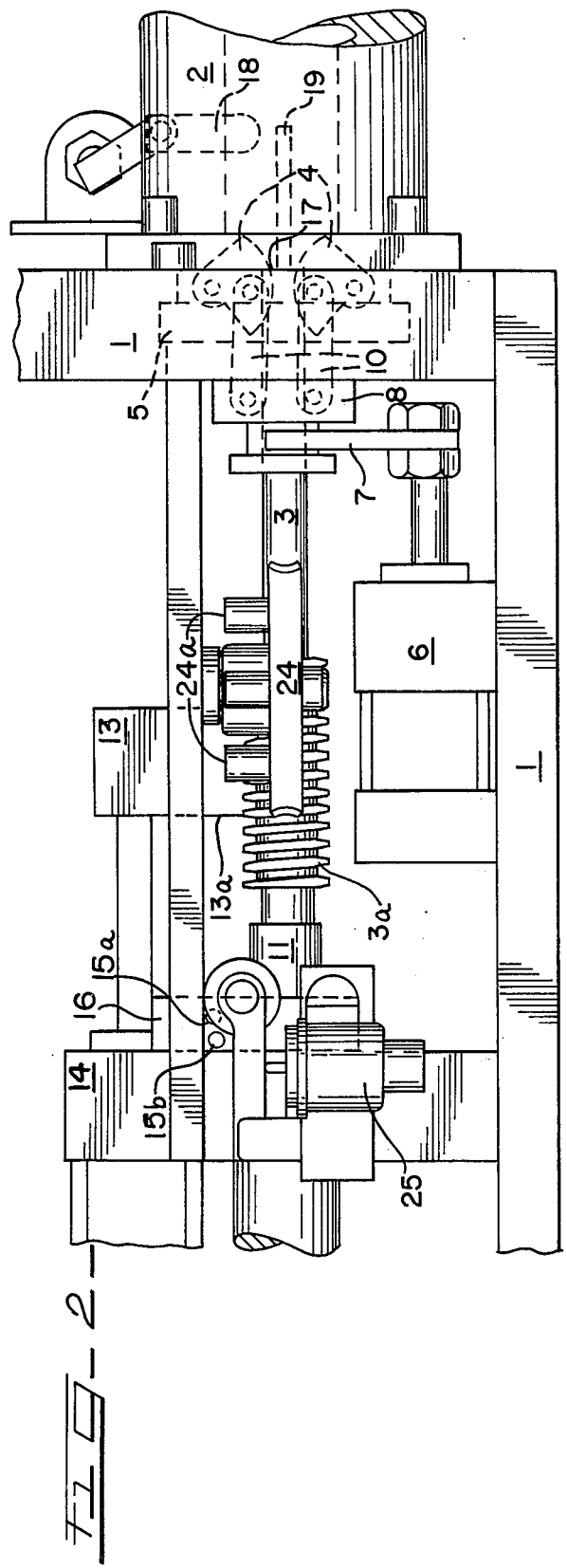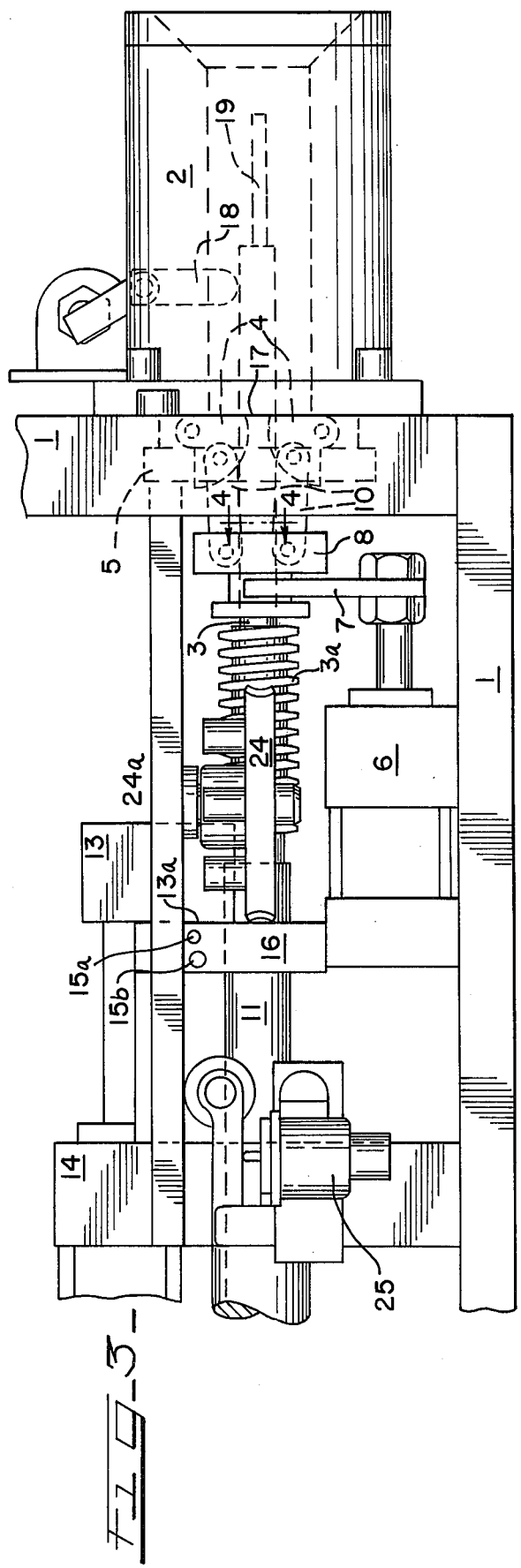

METHOD AND APPARATUS FOR MAKING END CLOSURES FOR SHIRRED CASING STICKS

BACKGROUND OF THE INVENTION

This invention relates to an improved shirred stick of tubular food casing and more particularly to a shirred stick of tubular food casing having an end closure, and to a method and apparatus for making the same.

Man-made tubular food casings, particularly food casing prepared of regenerated cellulose, are used extensively in the manufacture of sausage products such as skinless frankfurters and the like. In general, these casings are prepared as hollow, thin-walled tubes of very great length. In practice, tubular casings of lengths ranging from about 12 to 49 meters or more are shirred and compressed to produce what is commonly termed in the art "shirred casing sticks or strands" of from about 20 to 70 cm. in length.

After shirred casing sticks are prepared, they are packaged and shipped to a food processor where individual sticks of casing are placed on stuffing horns and stuffed with food emulsion filling the casing to its fully extended length. Such casing sticks may be stuffed by manual or automatic operation.

Automated machines have been developed for the stuffing and/or stuffing and linking of shirred food casings with meat emulsion in the making of frankfurters, and the use of these machines, as, for example, disclosed in Townsend U.S. Pat. No. 3,115,668, has greatly increased the production rate of sausage product.

Heretofore, when the food casing was stuffed manually, the operator would deshirr a short length of casing from the end thereof and effect a closure to prevent the meat emulsion extruded into the shirred casing from being lost from the open end thereof. In the automated stuffing machines, the shirred casing sticks are fed automatically and rapidly onto the stuffing horn and it is required that the fore end of the casing stick have a plug or closure so as to effectively block the flow of food emulsion therefrom. Providing a casing having an end plug or closure formed therein generally can be more uniformly and economically accomplished during casing manufacture than during use of the casing. Various types of casing closures and methods for forming the same are known and have been disclosed, for example, in U.S. Pat. Nos. 3,162,893 to Townsend, 3,274,005 to Alsys, 3,383,222 to Alsys et al., and 3,419,401 to Matecki.

Although these casing end closures exhibit many advantages over the manually formed closures, they have been found to have certain limitations such as not being readily formable on shirring machines, being difficult to control the amount of casing used in forming the end closure, being too tightly anchored in the bore, being too rigid to be employed in some versions of the automatic linking means of stuffing machines, or unfolding or everting in a non-uniform or non-symmetric manner.

Accordingly, it is one object of this invention to provide a new and improved method of closing the fore end of a shirred casing stick for food or other materials.

Another object of this invention is to provide an improved method for closing the end of a shirred casing stick utilizing only the material of the casing in the closure.

Another object of the invention is to provide a new and improved method of producing closures for hollow shirred sticks of tubular casings.

Yet another object of the invention is to provide an end closure which is readily and uniformly extended or caused to evert by the injection of food emulsion into the casing.

Yet another object of the invention is to provide an end closure which is formed without damaging the casing material.

Still another object of this invention is to provide a new and improved device for practicing the aforesaid methods.

Other and additional objects of the invention will become apparent from the specifications, description and accompanying drawings.

SUMMARY OF THE INVENTION

In the practice of the present invention, there is produced a hollow shirred casing stick having successive terminal pleats of one end thereof twisted into a substantially cylindrical radially wound configuration, at least a portion of which is implanted within said hollow shirred stick to form an end closure therefor. The end closure in said shirred casing stick will, in general, be suitable to restrain the passage of food emulsion in a manner required for use on automatic stuffing machines, yet will enable unwanted emulsion to be readily stripped from the partially filled end of a stuffed casing. The end closure as produced by the present invention may be formed from an essentially predetermined amount of tubular casing, and may be pervious to the passage of air or other gases, if so desired.

The present invention comprises both a method and apparatus for forming the end closure. The method, in general, comprises deshirring casing material from one end of the casing stick, spirally winding the deshirred material into a wall portion generally transverse the bore of the casing stick; and advancing the wall portion into the bore of the casing stick while simultaneously winding deshirred casing material on a rotating mandrel to form a generally cylindrically radially wound portion following the wall portion.

The casing end closure device of the present invention comprises pickup means for engaging an end of a casing stick, including means for forming a spirally twisted wall substantially transverse the bore of the casing stick; gripping means including means for forming a substantially cylindrical portion of casing material disposed substantially concentric with the bore of the casing stick, following the wall portion; and means for progressively advancing the gripping means into the bore of the casing stick whereby the enclosure is formed entirely therein.

BRIEF DESCRIPTION OF THE DRAWING

The foregoing and other features of the invention set out in the appended claims are incorporated in the method and apparatus of manufacture and in the article, preferred embodiments of which are now to be described with reference to the accompanying drawing in which:

FIG. 1 is a sectional side elevation view of the casing end closure device of the present invention, illustrating the mandrel in the withdrawn position.

FIG. 2 is an enlarged sectional view of the central portion of the end closure device of FIG. 1, illustrating the wedges in the extended position.

FIG. 3 is an enlarged sectional side elevation view of the central portion of the end closure device of FIG. 1, illustrating the mandrel in an advanced position.

FIG. 4 is a cross-sectional view of the mandrel taken substantially along line 4—4 of FIG. 3.

FIG. 5 is an enlarged sectional view of a casing end closure implanted within the end of a portion of a shirred casing stick.

FIG. 6 is an enlarged sectional view of a casing end closure not pervious to the passage of air or gases implanted within the end of a portion of a shirred casing stick.

DESCRIPTION OF THE PREFERRED EMBODIMENT

Turning now to the drawing, wherein like reference numerals denote like parts, there is shown in FIG. 1, a sectional side elevation view of the end closure device of the present invention.

The device includes a frame 1 having at one end thereof a horizontal strand guide 2. A rotatable translatable mandrel 3 is provided concentric with the guide 2.

Included on the mandrel 3 is a pickup means adapted to engage the terminal pleats of a casing stick and deshirr the same. Retractable pickup wedges 4, pivotably mounted on pickup block 5, are keyed to the mandrel 3, proximate the end thereof adjacent the guide 2, in such manner as to permit relative axial motion therebetween, with the wedges 4 sliding in channels 9 formed in the mandrel 3. Extension and retraction of the wedges 4 is effected by the wedge actuator cylinder 6 acting through a yoke 7, a pickup slide 8 and wedge levers 10.

Means are provided for rotating the pickup means subsequent to engagement with said terminal pleats and for rotating and advancing the mandrel 3. The mandrel 3 is keyed to motor sleeve 11 of motor 12 so as to permit relative axial motion therebetween. The motor 12 provides for translation of the mandrel 3, as well as rotation, as will be described in detail below.

A portion of mandrel 3 is formed as a worm 3a. Two side worm gears 24 are rotatably mounted on vertical shafts flanking the mandrel 3, in position to mate with worm 3a. When the side worm gears 24 are prevented from rotating, i.e. locked, rotation of the mandrel 3 will cause the same to advance. Locking and unlocking of the side worm gears 24 and retraction of the mandrel 3 at the completion of the closure formation cycle is accomplished by the worm gear stop block 13 which is positionally controlled by gear stop cylinder 14.

The wedge actuator cylinder 6 and the gear stop cylinder 14 are controlled by switches activated by follower pins 15a and 15b carried on nonrotatable follower 16 as will be more fully detailed below.

In operation, a shirred casing stick 20 is inserted into the guide 2 until the end of the stick 20 abuts the pickup face 17 of the pick-up block 5. In so doing, the start cycle switch 18 is tripped prior to effecting the abuttment.

Tripping of the switch 18 actuates the wedge actuating cylinder 6, causing it to advance and pivot the wedges 4 forward approximately 30°–40° through the yoke 7, pickup slide 8 and wedge levers 10. At the same time, the gear stop cylinder 14 advances the gear stop block 13 which moves into abuttment with stop pins 24a formed on the upper surface of side worm gears 24, locking them in position. The switch 18, acting through a time delay element (not shown), also starts the motor 12 which turns the motor sleeve 11. The mandrel 3, keyed to the sleeve 11, also begins to rotate.

As the mandrel 3 turns, the worm 3a winds its way through the now stationary side worm gears 4. After the mandrel 3 has advanced a predetermined number of turns, preferably 1 or 2, the pin 15a on the follower 16 trips a switch 25 causing the wedge actuator cylinder 6 to retract the wedges 4 flush with the pickup face 17.

The mandrel 3 continues to wind through the locked side worm gears 4 until follower pin 15b trips a second switch (not shown) stopping the motor 12 and causing the gear stop cylinder 14 to retract the gear stop block 13. The back side 13a of stop block 13 engages the follower 16, drawing it and mandrel 3 back to the retracted position.

Thus, when a casing stick 20 is inserted into the closure device as described above, the wedges 4 enter the casing stick bore and engage the terminal pleats 20a of the stick 20. Due to the delay imposed by the time delay element, the pickup wedges 4 engage the casing stick 20 prior to commencement of rotation of the mandrel 3. Experiments indicate that consistent pickup of the casing is more easily achieved and tearing of the terminal pleats 20a is avoided if the pickup device projects into the bore at the time of contact with the stick 20, prior to rotation. Similarly, it has been found that retractable pins may be substituted for the wedges 4. However, the pins suffer from the disadvantage that pin dimensions must be varied in accordance with the diameter of the shirred stick to be closed, while wedges may be successfully employed with a variety of stick sizes without modification or adjustment of the closure device.

When the mandrel 3 rotates, the terminal pleat 20a being engaged by the pickup wedges 4 is twisted thereby to form a "wall" 21 of casing draped over the nose of the mandrel 3 and lying transverse to the bore. This wall 21, which will become the nose portion of the finished end closure, may be wound so as to be substantially impervious to the passage of gases, such as entrapped air, therethrough. If it is desired that the finished closure have a passage therethrough to permit the escape of entrapped air during stuffing, an axially projecting pin 19, concentric with the bore, may be included on the nose of the mandrel 3 in a manner known in the art. In this case, the wall 21 forms around the pin 19 which leaves a passage 21a upon withdrawal of the mandrel 3.

As previously described, the wedges 4 retract after approximately 1 to 2 revolutions of the mandrel 3. Upon retraction of the wedges 4, the grip on the casing material is transferred to the relatively sharp corners 22a of one or more longitudinal flutes or grooves 22 formed in the mandrel 3 and adapted to grip the casing material during the remainder of the process of forming the closure.

After the retraction of the wedges 4, the mandrel 3 continues to rotate and advance into the bore of the shirred stick whereby a very uniform radial winding about the mandrel 3 is achieved, having a controlled pitch, i.e. a definite, fixed number of twists or folds per unit length of closure.

Following the retraction of the wedges 4 and a further predetermined number of rotations of the mandrel 3, preferably 8 to 10, the motor is stopped by the tripping of a switch, which also causes the gear stop cylinder 14 to retract the mandrel 3, as previously described, while the end closure is held in place abutting the pickup face 17. The end closure is now complete and the shirred stick 20 is removed from the guide 2.

The end closure formed in a hollow shirred casing stick in accordance with the practice of the present invention may, in general, be readily formed in any hollow shirred casing stick prepared from tubular casing of varying diameter and wall thickness on any of the shirring machines well known in the art.

After the mandrel 3 has been withdrawn, the shirred casing stick 20, with an end closure formed therein, has, in general, the configurations shown in either of FIGS. 5 and 6 wherein are illustrated enlarged sectional views of the fore end of a shirred casing stick 20 with two embodiments of the end closure implanted therein.

The end closure of the present invention has been found to exhibit a substantially cylindrical hollow radially wound configuration 23 wherein successive terminal pleats of the shirred stick are twisted into the bore thereof about the mandrel 3 advancing thereinto. The end closure is integrally secured to the fore end surface of the shirred casing stick 20 and generally conforms to the bore of the stick, extending therein so as to form an annular space between the end closure and the internal wall of the stick.

The end closure illustrated in FIG. 5 is pervious to the passage of air or various gases. A passage 21a extends through the closure end wall 21 which will permit the passage of gases therethrough but will restrain the passage of food emulsion.

In FIG. 6 there is illustrated a sectional view of the fore end of a shirred casing stick 20 having an end closure implanted entirely within said stick 20 which is substantially impervious to the passage of air or gases, the end wall 21 being substantially completely closed.

It is essential to the practice of the present invention that a rotating mandrel be advanced into the bore of the shirred casing stick and that successive terminal pleats of the casing stick are successively wound about said advancing mandrel. The diameter of the mandrel is not critical, generally depending on the inside diameter of the shirred casing stick within which the end closure is to be formed. The diameter may be varied within the limits that it must be small enough to be freely inserted into the bore of the shirred casing stick without engaging any portion of the internal diameter thereof and should be large enough so that it is essentially rigid and will not be damaged as the casing material is twisted thereabout.

In experiments with casings having a preshirred diameter of approximately 20 mm., it was determined that an optimal closure measures approximately 2-3 cm. in length. It was further determined that mandrel diameters of between 6 and 9.5 mm. were satisfactory, with 8 mm. being preferable. Under these conditions, 15-40 cm. of casing are required for an optimum closure.

The maximum permissible length of the end closure is determined by the equipment to be used in stuffing and is generally between 20 and 32 mm.

By combining the above-mentioned parameters, an embodiment of the end closure device of the present invention was constructed wherein the mandrel completes 10 revolutions per cycle (including the revolutions completed in the pickup phase prior to retraction of the wedges). A 24 pitch worm with a 4°46′ lead angle was employed, giving 3.324 mm. of travel per revolution. The closure thus obtained is slightly more than 25 mm. long and comprises approximately 28 cm. of casing material.

The shirred casing stick of the present invention exhibits a combination of desirable features that enhance its suitability for use in conjunction with automatic food stuffing apparatus. The end closure may, in general, be consistently formed from a relatively short length of tubular casing material; the end closure may be made so as to be pervious to the passage of air or gases while restraining the passage of food emulsion; and the end closure maintains its integrity during the multiplicity of operations common to the treatment, handling, shipping and stuffing of shirred casing. Most importantly, the casing in the closure is readily extended or caused to evert by the injection of food emulsion into the casing, whereby the extended portion may be gripped by the linker belts and the string of stuffed casing drawn from the stuffing horn, eliminating the possibility of "horn wrap". Also, by providing for ready eversion of the closure, back pressure on the closure is reduced, eliminating the possibility of rupture of the end known as "lead end tear-out".

The end closure and end closure device of the present invention are suitable for use with a wide variety of tubular materials including, preferably, a tubular regenerated cellulose casing of the type used in the preparation of sausages. Tubular films of a wide variety of diameters and wall thicknesses may be employed.

I claim:

1. A device for forming an end closure in a hollow shirred casing stick comprising:
    pickup means for engaging an end of a casing stick, said pickup means including means for deshirring casing material from the end of the casing stick and causing a twisted wall portion of the deshirred casing material to be disposed transversely of the bore of the casing stick;
    gripping means, including means for causing a twisted, substantially cylindrical portion of casing material deshirred from the end of the casing stick to be disposed within the bore of the casing stick, following said wall portion;
    means for extending said pick-up means for transferring the deshirred casing onto said gripping means and for releasing said pick-up means after such transfer; and
    means for progressively advancing said gripping means into the bore of the casing stick to form the end closure at least partially therein.

2. The device of claim 1, wherein said gripping means is separate from said pickup means.

3. The device of claim 2, wherein said pick-up means comprises a carrier means and closure-forming means projecting from said carrier means at one end thereof for supporting said end closure.

4. A device for forming an end closure in a hollow shirred casing stick comprising:
    pick-up means, comprising a carrier means and means projecting from said carrier means at one end thereof for engaging an end of a casing stick, said pickup means including means for deshirring casing material from the end of the casing stick and causing a twisted wall portion of the deshirred casing material to be disposed substantially transversely of the bore of the casing stick;
    gripping means, separate from said pickup means, including means for causing a twisted, substantially cylindrical portion of casing material deshirred from the end of the casing stick to be disposed substantially concentric with the bore of the casing stick, following said wall portion;

means for progressively advancing said gripping means into the bore of the casing stick, whereby the end closure is formed at least partially therein; and means for causing said closure forming means to be withdrawn from projecting from said carrier means.

5. The device of claim 4, wherein said carrier means is a mandrel, with the portion of said mandrel proximate said pickup means being substantially cylindrical, and said gripping means comprising at least one surface formed in said cylindrical portion of said mandrel, extending substantially radially of said portion.

6. The device of claim 5, wherein said surface comprises a sidewall of a longitudinal groove formed in said mandrel, said groove meeting the outer surface of said mandrel in relatively sharp corners adapted for grasping casing material being wound on said mandrel.

7. The device of claim 4, wherein said projecting means is in the extended position during formation of said wall portion and is retracted thereafter.

8. The device of claim 5, wherein said mandrel is caused to rotate about the longitudinal axis thereof and said projecting means is constrained to rotate with said mandrel.

9. The device of claim 8, wherein said mandrel is axially translatable relative to said member.

10. The device of claim 5, wherein said mandrel is formed with a worm gear, and said means for advancing said gripping means comprises rotating said mandrel through at least one fixed mating gear.

11. A device for closing an end of a hollow shirred stick of tubular casing comprising:
   a. pickup means adapted to engage the terminal pleats of said casing stick and deshirr the same;
   b. a mandrel having gripping means for engaging said deshirred casing material;
   c. means for rotating said pickup means subsequent to engagement with said terminal pleats to form deshirred casing material into a wall substantially transverse the bore of said casing stick.
   d. means for rotating said mandrel subsequent to said engagement of said pickup means and said terminal pleats; and
   e. means for disengaging said pickup means from said transverse wall subsequent to the formation thereof, whereby casing material is progressively deshirred from the end of said casing stick and wound on said mandrel.

12. The device of claim 11, wherein said pickup means comprises at least one member retractably projecting outwardly of said mandrel proximate the end thereof entering said bore.

13. The device of claim 12, wherein the portion of said mandrel proximate said pickup means is substantially cylindrical, and said gripping means comprises at least one surface formed in said cylindrical portion of said mandrel, extending substantially radially of said portion.

14. The device of claim 13, wherein said surface comprises a sidewall of a longitudinal groove formed in said mandrel, said groove meeting the outer surface of said mandrel in relatively sharp corners adapted for grasping casing material being wound on said mandrel.

15. The device of claim 14, wherein said mandrel is rotated a relatively few revolutions relative to said stick prior to retraction of said pickup means.

16. The device of claim 15, wherein said mandrel is rotated a relatively greater number of revolutions subsequent to retraction of said pickup means.

17. The device of claim 12, wherein the portion of said member engaging said terminal pleats is substantially wedge-shaped.

18. The device of claim 17, wherein said member projects partially into a recess formed in said mandrel whereby said member is caused to rotate with said mandrel, said mandrel being axially translatable relative to said member.

19. A device for forming an end closure in a hollow shirred casing stick comprising:
   pickup means,
   gripper means,
   carrying means for said pickup and gripping means,
   deshirring means to cause said pickup means to engage said casing stick to deshirr a portion thereof into a twisted wall portion of casing material positioned in the hollow portion of the stick disposed substantially transversely of the bore of the casing,
   means to cause said pickup means to disengage from the stick and thereby effectively expose said gripping means to the wall portion of the stick to continue the deshirring by causing a continued twisting of the deshirred casing into a cylindrical twisted portion of the casing material disposed substantially concentric with the bore of the casing.

20. The device of claim 19, and means for advancing said gripping means to form the end closure at least partially within the bore of the casing stick.

21. A method of forming an end closure in a hollow shirred casing stick comprising, in sequence, the steps of:
   1. deshirring casing material from one end of the casing stick;
   2. winding the deshirred material into a wall portion generally transverse to the bore of said casing stick; and
   3. advancing said wall portion into the bore of said casing stick while winding a generally cylindrically twisted portion following said wall portion, said cylindrically twisted portion being composed of casing material deshirred from said one end of said casing stick and wound on a rotating, axially translating mandrel.

22. A method of forming an end closure in a hollow shirred casing stick comprising the steps of:
   1. winding a wall portion substantially transverse to the bore of the casing stick, said wall portion being composed of casing material deshirred from one end of said casing stick; then
   2. winding a generally cylindrically twisted portion following said wall portion, said cylindrical portion being composed of casing material deshirred from said one end of said casing stick and wound on a rotating mandrel; and
   3. causing said portions to be advanced into the bore of said casing stick by axial translation of said mandrel during the winding of said cylindrical portion.

* * * * *